(12) United States Patent
Lazarof

(10) Patent No.: US 11,571,281 B2
(45) Date of Patent: Feb. 7, 2023

(54) METHOD AND APPARATUS FOR EXPANDABLE IMPLANTS

(71) Applicant: Apollonian Holdings LLC, Simi Valley, CA (US)

(72) Inventor: Sargon Lazarof, Encino, CA (US)

( * ) Notice: Subject to any disclaimer, the term of this patent is extended or adjusted under 35 U.S.C. 154(b) by 0 days.

(21) Appl. No.: 16/265,074

(22) Filed: Feb. 1, 2019

(65) Prior Publication Data

US 2019/0239985 A1   Aug. 8, 2019

Related U.S. Application Data

(60) Provisional application No. 62/625,690, filed on Feb. 2, 2018.

(51) Int. Cl.
*A61C 8/00* (2006.01)
*A61C 9/00* (2006.01)

(52) U.S. Cl.
CPC .......... *A61C 8/0033* (2013.01); *A61C 8/0001* (2013.01); *A61C 9/0053* (2013.01)

(58) Field of Classification Search
CPC ... A61C 8/0033; A61C 8/0001; A61C 9/0053; A61C 8/003; A61C 8/0018; A61C 13/00; A61C 13/0004; A61C 13/0019; A61C 8/0096; A61C 8/0098; A61B 1/00
USPC ....................................... 433/174–176, 201.1
See application file for complete search history.

(56) References Cited

U.S. PATENT DOCUMENTS

| | | | | |
|---|---|---|---|---|
| 3,708,883 A * | 1/1973 | Flander | ................ | A61C 8/0075 433/174 |
| 4,321,914 A | 3/1982 | Begovac et al. | | |
| 5,470,230 A | 11/1995 | Daftary et al. | | |
| 5,681,167 A * | 10/1997 | Lazarof | ................ | A61C 8/0066 433/173 |
| 8,696,720 B2 | 4/2014 | Lazarof | | |
| 8,828,066 B2 | 9/2014 | Lazarof | | |
| 9,055,985 B2 * | 6/2015 | Lazarof | .............. | A61B 17/8625 |
| 2006/0194171 A1 * | 8/2006 | Lazarof | ................ | A61C 8/0033 433/173 |
| 2008/0208264 A1 | 8/2008 | Lazarof | | |
| 2008/0261175 A1 * | 10/2008 | Hurson | ................ | A61C 8/0022 433/173 |
| 2010/0304333 A1 | 12/2010 | Ghavidel | | |
| 2012/0064487 A1 | 3/2012 | Lazarof | | |

(Continued)

OTHER PUBLICATIONS

Extended European Search Report dated Dec. 14, 2021 for European Patent Application No. EP19748034.6 filed Feb. 1, 2019, 8 pages.

*Primary Examiner* — Ralph A Lewis
*Assistant Examiner* — Mirayda A Aponte
(74) *Attorney, Agent, or Firm* — Kilpatrick Townsend & Stockton LLP

(57) ABSTRACT

An apparatus may include an elongated hollow body with a plurality of skirts on one end of the elongated hollow body. An exterior of the elongated hollow body may have a plurality of fins. At least some of the plurality of fins may have a different diameter and/or placement along a length of the elongated hollow body. The elongated hollow body may be configured to receive a screw. The screw may be configured to expand the plurality of skirts upon insertion into an interior of the elongated hollow body. The plurality of fins may be configured to secure the apparatus when the apparatus is placed within a bore. The plurality of fins may secure the apparatus at least by engaging the bore.

6 Claims, 2 Drawing Sheets

(56) References Cited

U.S. PATENT DOCUMENTS

| | | |
|---|---|---|
| 2014/0148864 A1* | 5/2014 | Lacaze .................. A61B 17/844 |
| | | 606/327 |
| 2015/0302170 A1 | 10/2015 | Berckmans, III et al. |
| 2015/0320520 A1 | 11/2015 | Schulter et al. |
| 2016/0051348 A1 | 2/2016 | Boerjes et al. |
| 2017/0172712 A1 | 6/2017 | Rubbert et al. |

* cited by examiner

METHOD AND APPARATUS FOR EXPANDABLE IMPLANTS

RELATED APPLICATION

This application claims priority to U.S. Provisional Patent Application No. 62/625,690 filed on Feb. 2, 2018 and entitled "METHOD AND APPARATUS FOR EXPANDABLE IMPLANTS," the contents of which is hereby incorporated by reference in its entirety.

TECHNICAL FIELD

The subject matter disclosed herein relates to generally to medical and/or dental devices and more specifically to an expandable implant.

SUMMARY

In one aspect, there is provided an apparatus. The apparatus may include an elongated hollow body with a plurality of skirts on one end of the elongated hollow body. An exterior of the elongated hollow body may include a first fin and a second fin. The elongated hollow body may be configured to receive a screw. The screw may be configured to expand the plurality of skirts upon insertion into an interior of the elongated hollow body. The first fin and the second fin may each be configured to secure the apparatus when the apparatus is placed within a bore. The first fin and/or the second fin may secure the apparatus at least by engaging the bore.

In some variations, one or more features disclosed herein including the following features can optionally be included in any feasible combination. The first fin and/or the second fin may be a ridge and/or a flange. The first fin and the second fin may be oriented in parallel and/or substantially in parallel.

In some variations, a first diameter of the first fin may be greater than a second diameter of the second fin such that the first fin protrudes more from the elongated hollow body than the second fin.

In some variations, the exterior of the elongated hollow body may further include a third fin. A first distance between the first fin and the second fin may be greater than a second distance between the second fin and the third fin.

In some variations, the first fin may be part of a set of minor fins disposed on the exterior of the elongated hollow body. The second fin may be a part of a set of major fins disposed on the exterior of the elongated hollow body. Fins forming the set of minor fins have a smaller diameter, protrude less from the elongated hollow body, and/or are spaced closer together than fins forming the set of major fins. The set of minor fins may be disposed along a first portion of the elongated hollow body of the apparatus while the set of major fins may be disposed along a second portion of the elongated body of the apparatus. The first portion of the elongated hollow body may be positioned substantially within the gum of the patient when the apparatus is placed into and/or secured in the bore while the second portion of the elongated hollow body may be positioned substantially inside the bore when the apparatus is placed into and/or secured in the bore.

In some variations, the bore may be inside a jawbone of a patient.

In some variations, an opposite end of the apparatus may be configured to receive a prosthesis.

In another aspect, there is provided a method for securing and loading an expandable implant. The method may include: securing an expandable implant by at least inserting, into an elongated hollow body of the expandable implant, a screw configured to expand a plurality of skirts on one end of the elongated hollow body; scanning at least a portion of the expandable implant including a head of the inserted screw that is left exposed after the insertion of the expandable implant; milling, based at least on the scan, a prosthetic capable of being received by and/or affixed to the expandable implant; and securing the prosthetic to the expandable implant.

In some variations, one or more features disclosed herein including the following features can optionally be included in any feasible combination. The scan may be a three-dimensional (3D) digital scan. The prosthetic may be formed using three-dimensional (3D) printing and thereafter milled.

In some variations, the prosthesis may be a dental prosthesis.

In some variations, the expandable implant may further include a plurality of fins. The expandable implant may be secured in a bore by the plurality of fins engaging the bore. The bore may be inside a jawbone of a patient. The plurality of fins may include a set of minor fins and a set of major fins. Fins forming the set of minor fins have a smaller diameter, protrude less from the elongated hollow body, and/or are spaced closer together than fins forming the set of major fins. The set of minor fins may be disposed along a first portion of the elongated hollow body of the expandable implant while the set of major fins may be disposed along a second portion of the elongated body of the implant. The first portion of the elongated hollow body may be positioned substantially within the gum of the patient when the expandable implant is placed into and/or secured in the bore while the second portion of the elongated hollow body may be positioned substantially inside the bore when the expandable implant is placed into and/or secured in the bore.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an expandable implant, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, and/or elements.

DETAILED DESCRIPTION

A prosthesis may be affixed to an implant immediately after the placement of the implant. For example, the prosthesis may be a dental prosthesis (e.g., crown and/or the like) that is affixed to a dental implant immediately after the placement of the dental implant. The dental implant may be an expandable implant having a hollow body that includes a plurality of skirts, which may be expandable upon insertion of an expansion screw. Expandable implants are described in more detail in U.S. Pat. Nos. 8,828,066 and 8,696,720, the disclosures of which are incorporated herein by reference in their entirety.

In some implementations of the current subject matter, in order to provide prosthesis that is capable of receiving and/or being affixed to an exposed end of an expandable implant including a head an expansion screw used to secure the expandable implant, the exposed end of the expandable implant including the head of the expansion screw may be scanned. For example, the exposed end of the expandable implant including the head of the expansion screw may be scanned using any type of imaging techniques including, for example, three-dimensional (3D) digital scanning and/or the like. Moreover, this scanning may be performed immediately after the expandable implant is secured, for example, within a jawbone of the patient. A suitable prosthesis such as, for example, a dental prosthesis and/or the like, that is capable of receiving and/or being affixed to the expandable implant may be milled based on the scan. For instance, the prosthesis may be formed using any appropriate techniques including, for example, three-dimensional (3D) printing and/or the like, and thereafter milled. It should be appreciated that the resulting prosthesis can be affixed immediately to the expandable implant, for example, on a same day as the placement of the expandable implant. By contrast, a prosthesis can be affixed to a conventional implant only after a lengthy healing period.

Figure 1:
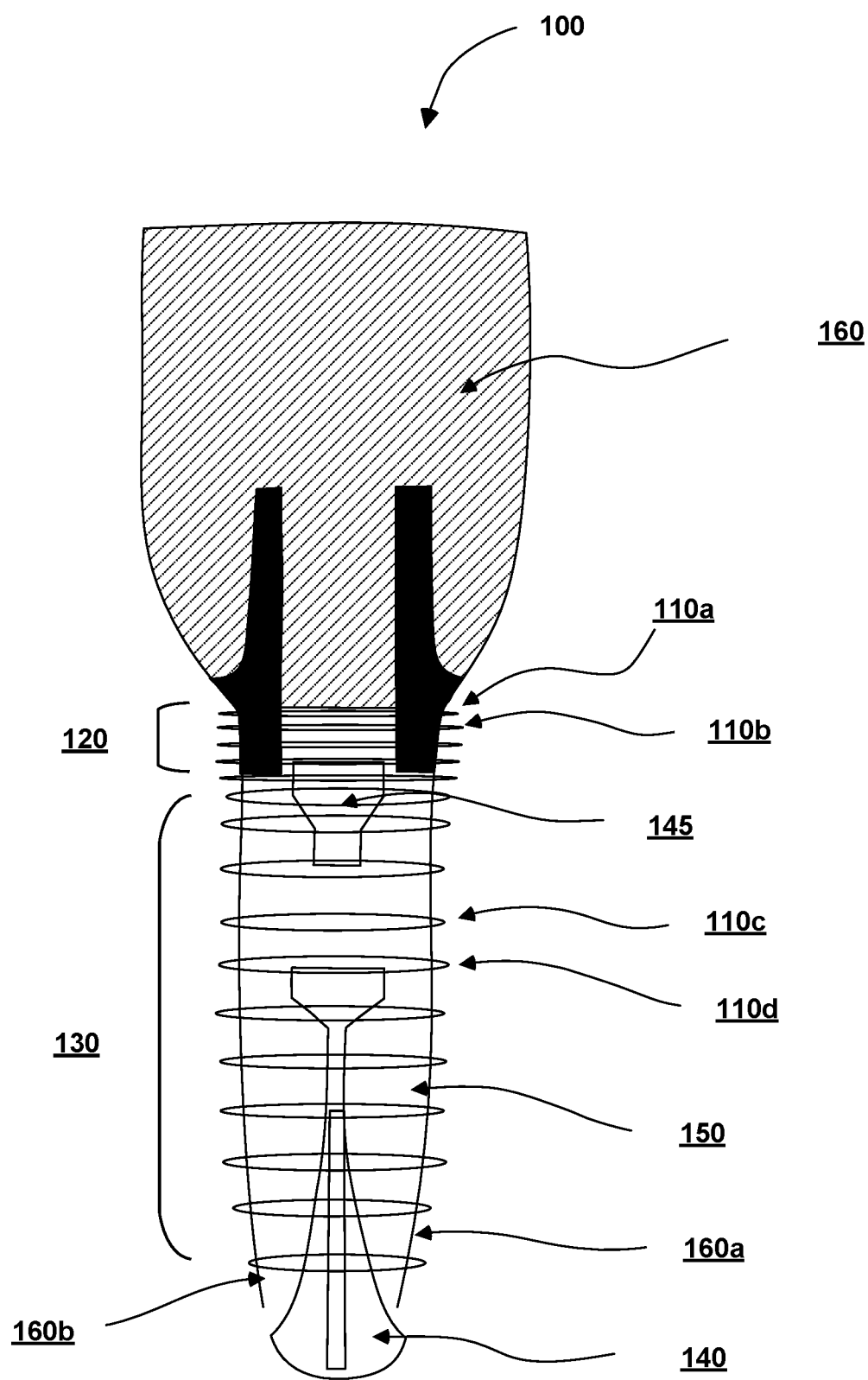
FIG. 1 depicts an expandable implant having a plurality of fins consistent with some implementations of the current subject matter.

In some implementations of the current subject matter, an expandable implant, such as, for example, a dental implant, may be configured to have one or more fins for securing the expandable implant in a desired location such as, for example, a bore within a jawbone of a patient. FIG. 1 depicts an example of an expandable implant 100 consistent with implementations of the current subject matter. Referring to FIG. 1, the expandable implant 100 may include a plurality of fins disposed on an exterior of a body 150 of the expandable implant 100. In the example shown in FIG. 1, the expandable implant 100 may include a first fin 110a, a second fin 110b, a third fin 110c, and a fourth fin 110d. As used herein, a fin may refer to any protruding structure including, for example, a flange, a ridge, and/or the like.

According to some implementations of the current subject matter, each of the first fin 110a, the second fin 110b, the third fin 110c, and the fourth fin 110d may be a separate structure that is oriented in parallel and/or substantially in parallel to adjacent fins. Notably, unlike the threading around a conventional threaded implant, the first fin 110a, the second fin 110b, the third fin 110c, and the fourth fin 110d may not form a portion of a helix that spirals around the body 150 of the expandable implant 100. As such, the expandable implant 100 may be inserted into the desired location (e.g., the bore within the jawbone of the patient) whereas a conventional threaded implant must be screwed in place. Moreover, as FIG. 1 shows, the expandable implant 100 may be secured at the desired location by inserting, into the body 150 of the expandable implant 100, an expansion screw 140. The body 150 of the expandable implant 100 may be elongated and hollow. Moreover, at least one end of the body 150 of the expandable implant 100 may include a plurality of skirts such as, for example, a first skirt 160a and a second skirt 160b, that expand upon insertion of the expansion screw 140. The expansion screw 140 may be covered with a screw cap 145 before the expandable implant 100 is loaded with a prosthesis 160. It should be appreciated that the prosthesis 160 may be any type of prosthesis including dental prosthesis such as, for example, a crown and/or the like.

In some implementations of the current subject matter, the fins disposed along the body 150 of the expandable implant 100 may vary in size. For example, at least some of the first fin 110a, the second fin 110b, the third fin 110c, and the fourth fin 110d may have different diameters. Therefore, at least some of the first fin 110a, the second fin 110b, the third fin 110c, and the fourth fin 110d may protrude from the body 150 of the expandable implant 100 more than other fins. Furthermore, the placement of the fins may vary along a length of the body 150 of the expandable implant 100.

As FIG. 1 shows, the expandable implant 100 may include a set of minor fins 120 that includes the first fin 110a and the second fin 110b. The minor fins 120 may be smaller in diameter, spaced closer together, and/or protrude less from the body 150 of the expandable implant 100. Alternatively and/or additionally, the expandable implant 100 may include a set of major fins 130 that includes the third fin 110c and the fourth fin 110d. The major fins 130 may be larger in diameter, spaced farther apart, and/or protrude more from the body 150 of the expandable implant 100. For instance, the radius $r_m$ of the first fin 110a and/or the second fin 110b may be less than the radium $r_M$ of the third fin 110c and/or the fourth fin 110d. Moreover, the distance $d_m$ between the first fin 110a and the second fin 110b may be less than the distance $d_M$ between the third fin 110c and the fourth fin 110d.

In some implementations of the current subject matter, the size and/or placement of the fins can correspond to the respective location of the fins, for example, once the expandable implant is secured in place. For example, as shown in FIG. 1, the minor fins 120 (e.g., smaller, more closely spaced, and/or less protruding fins) may be situated along the proximal end of the expandable implant 100, for example, around a portion of the body 150 of the expandable implant 100 that is positioned substantially within the gum of the patient and/or in an area of transition between the gum and the jawbone of the patient. By contrast, the major fins 130 (e.g., larger, more widely spaced, and/or more protruding fins) may be disposed along the remainder of the expandable implant 100, for example, around portion of the body 150 of the expandable implant 100 that is positioned substantially inside the bore within the jaw bone of the patient.

Figure 2:
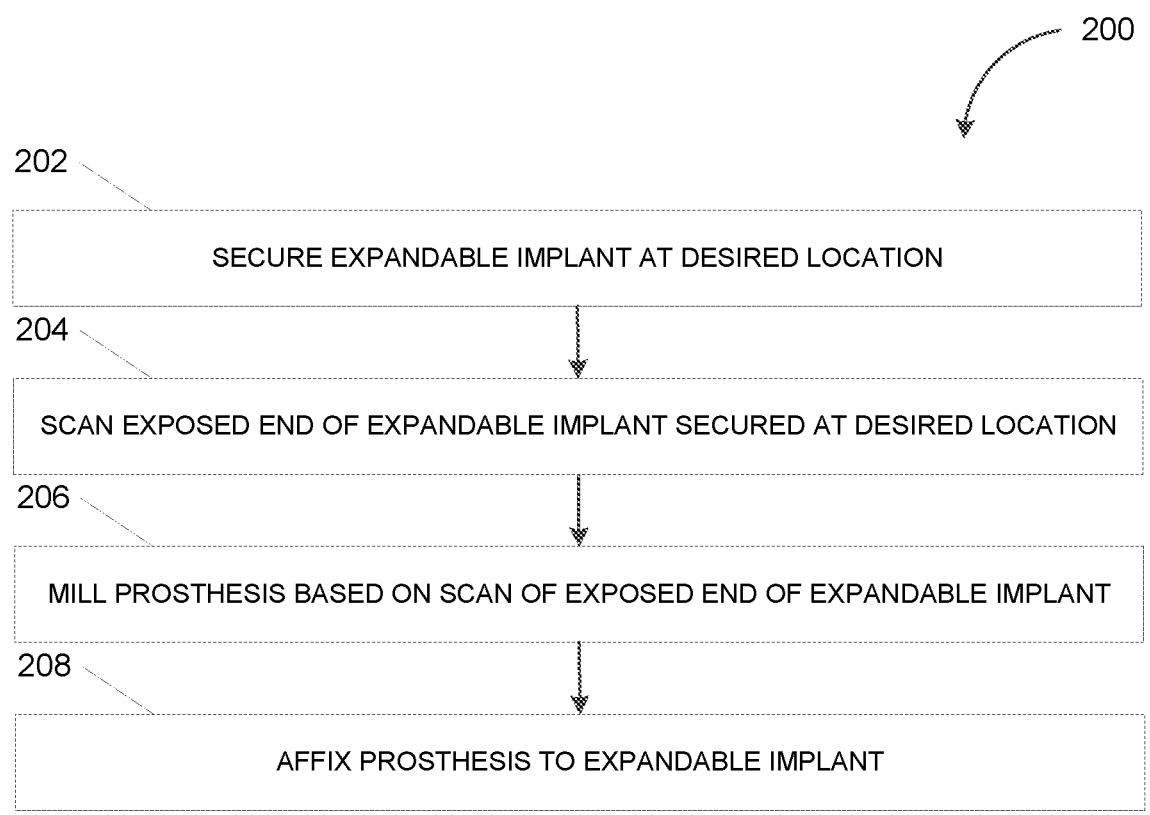
FIG. 2 depicts a flowchart illustrating a process for securing and loading an expandable implant consistent with some implementations of the current subject matter.

FIG. 2 depicts a flowchart illustrating a process 200 for securing and loading an implant, in accordance with some example embodiments. In some implementations of the claimed subject matter, the process 200 may be performed in order to secure the expandable implant 100 and loading the expandable implant 100 with a prosthesis such as, for example, the prosthesis 160.

At 202, the expandable implant 100 may be secured at a desired location. For example, the expandable implant 100 may be secure in a bore within a jawbone of a patient. As noted, the expandable implant 100 may be inserted in the desired location and secured by expanding the expansion screw 140. Moreover, the expandable implant 100 may be secured in the desired location by a plurality of fins including, for example, the first fin 110a, the second fin 110b, the third fin 110c, and/or the fourth fin 110d shown in FIG. 1.

At 204, an exposed end of the expandable implant 100 secured at the desired location may be scanned. For instance, the exposed end of the expandable implant 100 including the head of the expansion screw 140 and/or the screw cap 145 may be scanned using any type of imaging techniques including, for example, three-dimensional (3D) digital scanning and/or the like. As used herein, the exposed end of the expandable implant 100 may refer to any portion of the expandable implant 100 that is not covered and/or obscured by the anatomy of the patient including, for example, the gum of the patient, the jawbone of the patient, and/or the like. However, it should be appreciated that the scan may nevertheless capture at least a portion of any anatomical features that are adjacent to the exposed end of the expandable implant 100.

At 206, a prosthesis may be milled based on the scan of the exposed end of the expandable implant 100. For example, a prosthesis (e.g., a dental prosthesis and/or the like) that is capable of receiving and/or being affixed to the expandable implant 100 (e.g., at the exposed end of the expandable implant 100) may be milled in accordance with the scan of the exposed end of the expandable implant 100. Moreover, the prosthesis (e.g., the dental prosthesis and/or the like) may be formed using any appropriate techniques including, for example, three-dimensional (3D) printing and/or the like.

At 208, the prosthesis may be affixed to the expandable implant 100. In some implementations of the claimed subject matter, the prosthesis (e.g., the dental prosthesis and/or the like) may be affixed immediately to the expandable implant 100 without any intervening healing period. For instance, the prosthesis (e.g., the dental prosthesis and/or the like) may be affixed to the expandable implant 100 on a same day as the placement of the expandable implant 100.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An apparatus, comprising:
   an elongated hollow body with a plurality of skirts on one end of the elongated hollow body, an exterior of the elongated hollow body having a first fin set and a second fin set, each first fin of the first fin set comprising a ridge protruding non-helically from the elongated hollow body, the elongated hollow body further being configured to receive a screw, the screw comprising an expansion member and a screw cap having a diameter, the expansion member being configured to expand the plurality of skirts upon insertion into an interior of the elongated hollow body, the first fin and the second fin each being configured to secure the apparatus when the apparatus is placed within a bore, and the first fin set and/or the second fin set securing the apparatus at least by engaging the bore, the screw cap protruding from the hollow body when the first find and/or second fin secure the apparatus; and
   a prosthesis that is configured to mount onto the screw cap and proximate the bore, the sizing of the prosthesis resulting from an imaging scan of the screw head and the bore;
   wherein the first fin comprises a set of minor fins disposed on the exterior of the elongated hollow body, wherein the second fin set comprises a set of major fins disposed on the exterior of the elongated hollow body, and wherein fins comprising the set of minor fins have a smaller diameter, protrude less from the elongated hollow body, and/or are spaced closer together than fins comprising the set of major fins;
   wherein the set of minor fins is disposed along a first portion of the elongated hollow body of the apparatus, and wherein the set of major fins is disposed along a second portion of the elongated hollow body of the apparatus; and
   wherein the first portion of the elongated hollow body is configured to be positioned substantially within the gum of the patient when the apparatus is placed into and/or secured in the bore, and wherein the second portion of the elongated hollow body is configured to be positioned substantially inside the bore when the apparatus is placed into and/or secured in the bore.

2. The apparatus of claim 1, wherein the first fin and the second fin are oriented in parallel.

3. The apparatus of claim 1, wherein a first diameter of the first fin is greater than a second diameter of the second fin such that the first fin protrudes more from the elongated hollow body than the second fin.

4. The apparatus of claim 1, wherein the exterior of the elongated hollow body further includes a third fin, wherein a first distance between the first fin and the second fin is greater than a second distance between the second fin and the third fin.

5. The apparatus of claim 1, wherein the bore is inside a jawbone of a patient.

6. The apparatus of claim 1, wherein an end of the apparatus opposite the first fin and the second fin is configured to receive the prosthesis.

* * * * *